United States Patent
Förster et al.

(10) Patent No.: US 12,123,757 B2
(45) Date of Patent: Oct. 22, 2024

(54) METHOD FOR OPERATING A MAGNETIC-INDUCTIVE FLOWMETER AND CORRESPONDING MAGNETIC-INDUCTIVE FLOWMETER

(71) Applicant: KROHNE Messtechnik GmbH, Duisburg (DE)

(72) Inventors: Jan Förster, Essen (DE); Markus Dabrowski, Duisburg (DE); Thomas Fritsch, Jüchen (DE)

( * ) Notice: Subject to any disclaimer, the term of this patent is extended or adjusted under 35 U.S.C. 154(b) by 345 days.

(21) Appl. No.: 17/447,709

(22) Filed: Sep. 15, 2021

(65) Prior Publication Data

US 2022/0082419 A1  Mar. 17, 2022

(30) Foreign Application Priority Data

Sep. 15, 2020  (DE) ..................... 10 2020 123 941.6

(51) Int. Cl.
*G01F 1/60*  (2006.01)
*G01F 1/58*  (2006.01)

(52) U.S. Cl.
CPC ................ *G01F 1/60* (2013.01); *G01F 1/584* (2013.01)

(58) Field of Classification Search
CPC .................................. G01F 1/60; G01F 1/584
See application file for complete search history.

(56) References Cited

U.S. PATENT DOCUMENTS

| 4,019,385 A | * | 4/1977 | Watanabe | G01F 1/58 |
| | | | | 73/861.12 |
| 4,517,846 A | * | 5/1985 | Harrison | G01F 1/584 |
| | | | | 73/861.12 |
| 5,646,353 A | * | 7/1997 | Mesch | G01F 1/60 |
| | | | | 73/861.12 |
| 7,788,046 B2 | | 8/2010 | Schmalzried et al. | |
| 2006/0235634 A1 | | 10/2006 | Florin | |
| 2008/0250867 A1 | | 10/2008 | Schmalzried et al. | |

(Continued)

FOREIGN PATENT DOCUMENTS

CN  109974799 A  7/2019
DE  102005018179 A1  10/2006

(Continued)

*Primary Examiner* — Mohamed Charioui
*Assistant Examiner* — Lynda Dinh
(74) *Attorney, Agent, or Firm* — Patrick D. Duplessis (57) ABSTRACT

A method for operating a magnetic-inductive flowmeter includes: detecting the noisy raw measurement signal having a first signal path by a signal sensor with high impedance by the pair of electrodes; passing the detected, noisy raw measurement signal on to a first signal processing device; processing the detected, noisy raw measurement signal by the signal processing device at least into a noise-removed flow measurement signal; outputting the noise-removed flow measurement signal via a working signal interface; detecting the detected, noisy raw measurement signal of the first signal path with a second signal path; and transmitting the detected, noisy raw measurement signal at least indirectly to the first signal processing device and/or a second signal processing device. The first signal processing device and/or the second signal processing device also carry out a frequency analysis of the detected, noisy raw measurement signal. A corresponding magnetic-inductive flowmeter is also disclosed.

14 Claims, 6 Drawing Sheets

(56) References Cited

U.S. PATENT DOCUMENTS

| | | | |
|---|---|---|---|
| 2008/0262796 A1* | 10/2008 | Rufer | G01F 25/10 |
| | | | 702/184 |
| 2010/0300211 A1 | 12/2010 | Sugawara et al. | |
| 2012/0036941 A1* | 2/2012 | Drahm | G01F 1/60 |
| | | | 73/861.12 |
| 2016/0273948 A1 | 9/2016 | Tower, III et al. | |
| 2017/0234708 A1* | 8/2017 | Xie | G01F 25/10 |
| | | | 73/861.12 |
| 2020/0018627 A1* | 1/2020 | Arai | G01F 1/60 |
| 2020/0166392 A1* | 5/2020 | Isik-Uppenkamp | G01F 1/60 |

FOREIGN PATENT DOCUMENTS

| | | |
|---|---|---|
| DE | 102007015368 A1 | 10/2008 |
| EP | 2259028 B1 | 7/2018 |
| JP | H04104013 A | 4/1992 |
| JP | H05223605 A | 8/1993 |
| JP | 2013257276 A | 12/2013 |

* cited by examiner

METHOD FOR OPERATING A MAGNETIC-INDUCTIVE FLOWMETER AND CORRESPONDING MAGNETIC-INDUCTIVE FLOWMETER

TECHNICAL FIELD

The invention relates to a method for operating a magnetic-inductive flowmeter having a measuring tube for guiding a medium, having a magnetic field generator for generating a magnetic field passing through the measuring tube perpendicular to the direction of flow of the medium, having a pair of electrodes for tapping an electrical voltage induced in the medium in the measuring tube as a noisy raw measurement signal, wherein the noisy raw measurement signal having a first signal path is detected by a signal sensor with high impedance by the pair of electrodes and is passed on as a detected, noisy raw measurement signal by the signal sensor to a first signal processing device and is processed by the signal processing device at least into a noise-removed flow measurement signal and the noise-removed flow measurement signal is output via a working signal interface. Furthermore, the invention also relates to an identical magnetic-inductive flowmeter suitable for carrying out the previously described method.

BACKGROUND

The flowmeters mentioned above, which are based on the magnetic-inductive measuring principle, have been known for decades. Accordingly, methods for operating such flowmeters as previously described have also been known for a long time. The magnetic-inductive measuring principle is based on the factor of force effect on charge carriers that move perpendicular to a magnetic field or that have a movement component perpendicular to the magnetic field in question. In order to carry out flow measurement based on this principle, the medium carried in the measuring tube must have a certain electrical conductivity. The faster the medium moves through the measuring tube and thus also through the magnetic field generated by the magnetic field generator, the greater the separation of charge carriers in the flowing medium of the corresponding measuring tube section, and the stronger an electric field caused by the charge separation, which is formed between the electrodes of the measuring tube and can be detected as an electric voltage between the electrodes. The measuring voltage between the electrodes develops proportionally to the flow velocity, at least during the period in which the magnetic field is constant and the conductivity of the medium or the charge carrier concentration in the medium is constant.

Even though the basic relationships of the magnetic-inductive measuring principle are perfectly clear, there are still some hurdles to be overcome in measurement practice until a flowmeter is available that reliably provides accurate flow information. One of these hurdles is that the electrical voltage induced in the medium is present as a significantly noisy raw measurement signal at the electrodes of the electrode pair. The signal-to-noise ratio of this noisy raw measurement signal is very unfavorable, so that reliable, stable flow information cannot be obtained directly from the noisy raw measurement data. This noise is mainly due to electrochemical processes at the electrodes.

To reduce the noise caused by electrochemical processes, it is known from the prior art, for example, to constantly change the direction of the magnetic field so that the voltage induced in the medium also changes direction. For this, the direction of the current flowing through the coils in the magnetic field generator is regularly changed. Since the magnetic field direction cannot be changed instantaneously due to the inductances present, but rather there is always a transition range in which the magnetic field is not constant, care must then be taken to ensure that only those raw measurement signals are used to determine the flow rate that have been captured at a constant magnetic field. By switching the magnetic field as described, certain electrochemical effects can be reduced, but the raw measurement signal at the electrodes is still very clearly noisy. In order to develop the noisy raw measurement signal into a suitable noise-removed flow measurement signal, the detected noisy raw measurement signal is noise-removed in a signal processing device, for example by averaging over a plurality of detected, noisy raw measurement signals. This noise-removed flow measurement signal thus obtained is then output via a working signal interface, typically via a 4-20 mA interface (often also with superimposed digital HART protocol).

The present invention is based on the knowledge that the noisy raw measurement signals not only contain information regarding the induced electrical voltage, i.e., flow information, but rather also information that has not yet been used at all, but can nevertheless represent a high added value for the user. However, with the magnetic-inductive flowmeter described at the beginning and the method for operating magnetic-inductive flowmeters, this raw measurement data is simply not accessible to the user for technical use.

SUMMARY

The object of the present invention is to make the noisy raw measurement signals technically available and to evaluate them beyond a flow information.

The previously derived and presented object is initially and essentially achieved in the method described above for operating a magnetic-inductive flowmeter and in the described magnetic-inductive flowmeter in that the detected, noisy raw measurement signal of the first signal path is detected with a second signal path and is transmitted at least indirectly to the first signal processing device and/or a second signal processing device, wherein the first signal processing device and/or the second signal processing device carry out a frequency analysis of the noisy raw measurement signal.

The noisy raw measurement signal detected in the first signal path is extracted by the second signal path using a circuit, thereby enabling further processing of the noisy raw measurement signals to be carried out at all. In order for further processing to occur, the noisy raw measurement signal detected by the second signal path is transmitted at least indirectly to the first signal processing device and/or to a second signal processing device. Regardless of which signal processing device is used, a frequency analysis of the noisy raw measurement signal is carried out there in either case.

According to the invention, it has been recognized that an analysis of the noisy raw measurement signals, even if they are available with high temporal resolution, is relatively problematic in the time domain. When the noisy raw measurement signals are subjected to frequency analysis, at least periodic noise signals can be readily distinguished from non-periodic noise signals, and in general periodic events in the medium of the magnetic-inductive flowmeter can be readily detected. For example, it was found that pressure and also temperature in the medium of the magnetic-inductive flowmeter have an effect on the noisy raw measurement signal and these influences can be identified by frequency analysis of the noisy raw measurement signal.

Whether the noisy raw measurement signals are transmitted from the second signal path to the first signal processing device or to the second signal processing device depends, for example, on whether the first signal processing device is capable of receiving and processing a further data stream at all.

In a preferred design of the method and of the magnetic-inductive flowmeter, it is provided that the signal sensor of the first signal path digitizes the noisy raw measurement signal with an analog/digital converter and transmits it as a digitized, detected, noisy raw measurement signal, and wherein the second signal path detects the digitized, detected, noisy raw measurement signal of the first signal path and transmits it to the first signal processing device and/or to the second signal processing device.

In modern magnetic-inductive flowmeters it is common that the—initially, of course, analog—noisy raw measurement signal is digitized in the first signal path and digitally processed in the first signal processing device. In practice, the signal processing device is often based on a microcontroller or a digital signal processor. In the described variation of the method and the magnetic-inductive flowmeter, this circumstance is used to detect the digitized, detected, noisy raw measurement signal of the first signal path with the second signal path digitally and then to transmit it to the first signal processing device and/or the second signal processing device. The fact that the detected, noisy raw measurement signal is digitized in the first signal path with an analog-to-digital converter does not change the fact that also the digitized, raw measurement signal is still a "noisy raw measurement signal", because no noise reduction is associated with the digital sampling of the analog, noisy raw measurement signal.

According to an alternative variation of the method and the magnetic-inductive flowmeter, it is provided that the signal sensor of the first signal path taps the noisy raw measurement signal from the electrodes with a high-impedance transformer stage and passes the tapped, noisy raw measurement signal with a high impedance on with a low impedance. This is also the case when the signal is then digitized in the first signal path. The second signal path detects the detected, noisy, raw measurement signal of the first signal path, which is passed on with low impedance, and transmits it to the first signal processing device and/or the second signal processing device. Preferably, the detected, noisy raw measurement signal transmitted to the first signal processing device and/or to the second signal processing device is digitized in the second signal path and the digitized, detected, noisy raw measurement signal is then transmitted to the first signal processing device and/or the second signal processing device.

The electrode arrangement in the measuring tube together with the electrically at least minimally conductive medium has a very high impedance, so that the noisy raw measurement signal present there in the form of the electrode voltage must also be tapped with a very high impedance for measurement purposes, so that the noisy raw measurement signal is detected with as little feedback as possible and the measurement signal does not collapse as a result of the measurement process alone. The transformer stage provided for this purpose can be implemented, for example, on the basis of impedance converters, by a high-impedance amplifier stage, e.g., on the basis of operational amplifiers, etc. The sensor side of the magnetic-inductive flowmeter with the electrode pair is electrically practically decoupled from the data processing in the rest of the signal path by means of the transformer stage. The output of the transformer stage should have a low impedance and can thus be electrically loaded, at least can be loaded more than the measuring path around the electrode arrangement.

This high-impedance, tapped, noisy raw measurement signal at the output of the transformer stage is now detected by the second signal path and transmitted to the first signal processing device and/or the second signal processing device, with digitization of the detected, noisy raw measurement signal by an analog/digital converter preferably also taking place along this path. The advantage of this approach is that completely different sampling rates and data streams can be used in the first signal path and in the second signal path, depending on how this is desired. It is conceivable, for example, that the sampling rate in the first signal path is selected to be significantly lower than in the second signal path, since the evaluation of the noisy raw measurement signals that are forwarded via the second signal path must be carried out with a significantly higher temporal resolution so that a desired bandwidth can be achieved in the frequency analysis of the detected, noisy raw measurement signal.

According to a preferred design of the method and of the magnetic-inductive flowmeter, it is provided that the detected, noisy raw measurement signal is transmitted to the second signal processing device external to the magnetic-inductive flowmeter via a further signal interface of the magnetic-inductive flowmeter different from the working signal interface. The noisy raw measurement signals detected via the second signal path are thus transmitted to the second signal processing device via a further signal interface, wherein the second signal processing device is then necessarily located outside the magnetic-inductive flowmeter. The further signal interface will then preferably be designed in a different technology than the working signal interface via which the noise-removed flow measurement signal is output. For example, it could be an Ethernet interface.

In a further preferred design of the method and the magnetic-inductive flowmeter, it is provided that the detected, noisy raw measurement signal is transmitted to the first signal processing device and/or the second signal processing device within the magnetic-inductive flowmeter. Thus, here the second signal processing device is located within the magnetic-inductive flowmeter. This does not contradict the solution of transmitting the detected, raw measurement signals via the further signal interface to outside the magnetic-inductive flowmeter. Both variations can also be implemented simultaneously.

A further preferred design of the method and of the magnetic-inductive flowmeter is characterized in that the magnetic field generated by the magnetic field generator is reversed, in particular periodically, and, for the frequency analysis, the first signal processing device and/or the second signal processing device use only those transmitted, noisy raw measurement signals that originate from a time window in which the magnetic field is constant.

A likewise preferred design of the method and of the magnetic-inductive flowmeter is characterized in that a plurality of frequency analyses with transmitted, noisy raw measurement signals from a plurality of time windows of constant magnetic field are calculated by the first signal processing device and/or by the second signal processing device, and the frequency-dependent result values of the frequency analyses are averaged to form an averaged frequency analysis, in particular wherein frequency analyses are averaged from at least ten time windows, preferably frequency analyses are averaged from at least 100 time windows.

According to a further design of the method and of the magnetic-inductive flowmeter, it is provided that a fast Fourier transform is carried out as the frequency analysis on the basis of the detected, noisy raw measurement signals, in particular wherein the number of noisy raw measurement signals is increased to the next higher power of two by zero padding, in particular when the number of noisy raw measurement values of a time window available for the frequency analysis does not correspond to a power of two.

Each previously described feature, which may have been described only in connection with the method for operating a magnetic-inductive flowmeter, applies of course equally objectively to a magnetic-inductive flowmeter designed to carry out the described method. Conversely, features that may have been described previously only in the context of a magnetic-inductive flowmeter are equally to be understood as features of the method described herein for operating the magnetic-inductive flowmeter.

BRIEF DESCRIPTION OF THE DRAWINGS

In detail, there are a multitude of possibilities for designing and further developing the method for operating the magnetic-inductive flowmeter according to the invention and the corresponding magnetic-inductive flowmeter according to the invention. For this, reference is made to the following description of embodiments in connection with the drawings.

DETAILED DESCRIPTION

In each of FIGS. 1 to 4, a method 1 for operating a magnetic-inductive flowmeter 2 and, at the same time, a corresponding magnetic-inductive flowmeter 2 are shown together.

The magnetic-inductive flowmeter 2 has a measuring tube 3 for guiding a medium, a magnetic field generator 4 for generating a magnetic field passing through the measuring tube 3 perpendicular to the direction of flow of the medium, and a pair of electrodes 5 for tapping an electric voltage induced in the medium in the measuring tube as a noisy raw measurement signal 6. This arrangement is also frequently referred to as the "sensor" of the magnetic-inductive flowmeter 2.

The noisy raw measurement signal 6 is detected with a first signal path 7 (see FIG. 1) by a signal sensor 8 with high impedance by the pair of electrodes 5, and is passed on as a detected, noisy raw measurement signal 9 from the signal sensor 8 to a first signal processing device 10. The detected, noisy raw measurement signal 9 is processed by the signal processing device 10 at least into a noise-removed flow measurement signal 11 and the noise-removed flow measurement signal 11 is then output via a working signal interface 12. In the illustrated embodiments, the working signal interface 12 is a two-wire current interface with superimposed HART protocol, as is widely used in the process industry.

Figure 1:
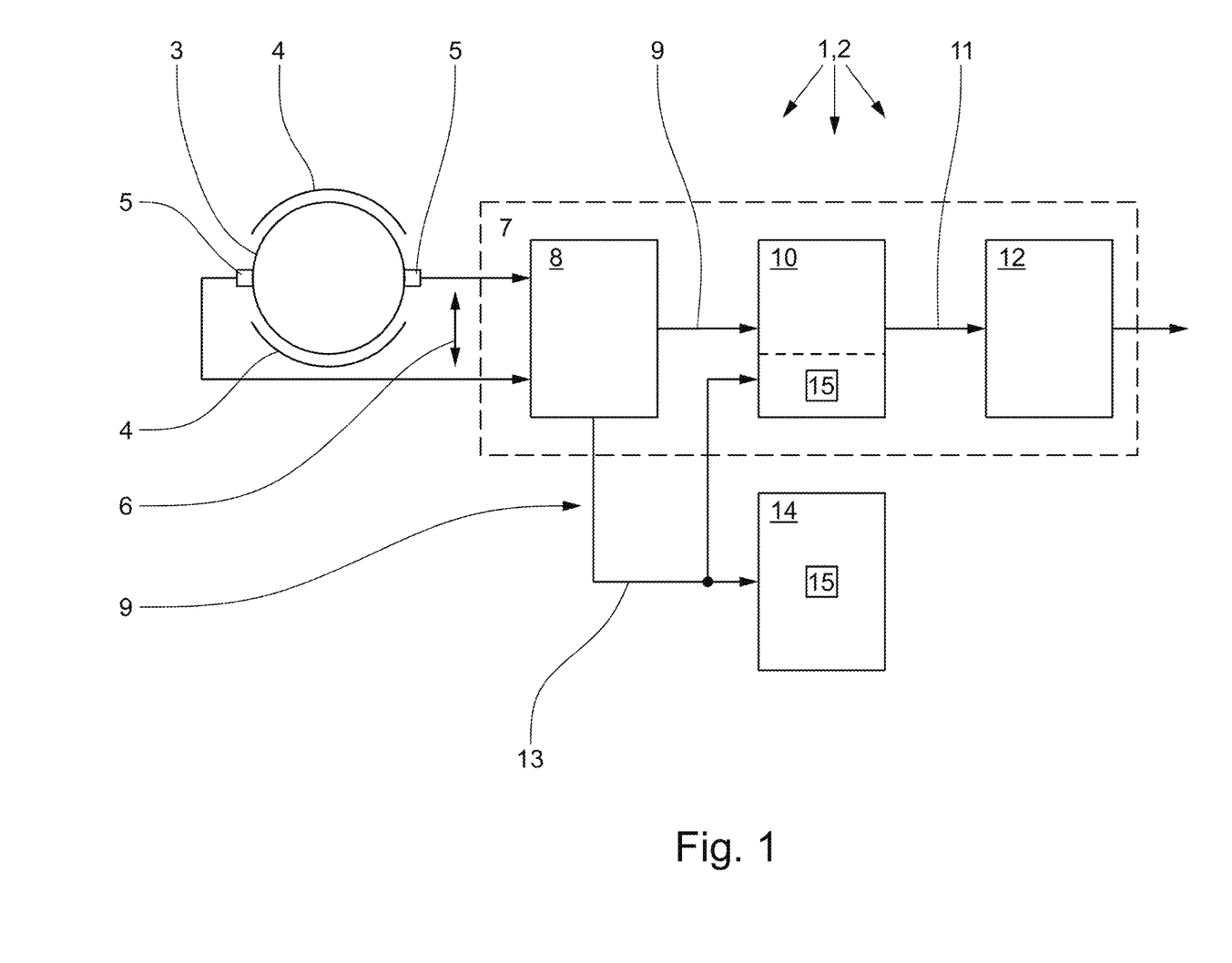
FIG. 1 illustrates a first basic variation of a method for operating a magnetic-inductive flowmeter and a corresponding magnetic-inductive flowmeter.

The first signal path 7 is surrounded by a dashed box in FIG. 1. These components of the magnetic-inductive flowmeter 2 usually form the so-called transmitter. In the signal processing device 10, in order to remove the noise of the detected, noisy raw measurement signal 9, a plurality of individual values are averaged and processed into a working, noise-removed flow measurement signal 11.

The methods shown in FIGS. 1 to 4 for operating a magnetic-inductive flowmeter 2 and the corresponding magnetic-inductive flowmeters 2 show various ways of extracting information, which is surprisingly present in the noisy raw measurement signal 6 and which actually has nothing to do with the primary measured variable of flow, from the noisy raw measurement signal 6 and making it technically usable. The embodiments shown have in common that, with a second signal path 13, the detected noisy raw measurement signal 9, 9' of the first signal path 7 is detected and transmitted at least indirectly to the first signal processing device 10 and/or to a second signal processing device 14, wherein the first signal processing device 10 and/or the second signal processing device 14 carries out a frequency analysis 15 of the noisy raw measurement signal 9, 9'. Using this measure, it is possible to detect periodic events affecting the noisy raw measurement signal. The measure is based on the surprising realization that a great deal of information is included among the noisy raw measurement data 6 that is not obviously related to the flow measurement variable of primary interest. For example, frequency analysis 15 is very good at detecting periodic pressure variations in the medium.

Figure 2:
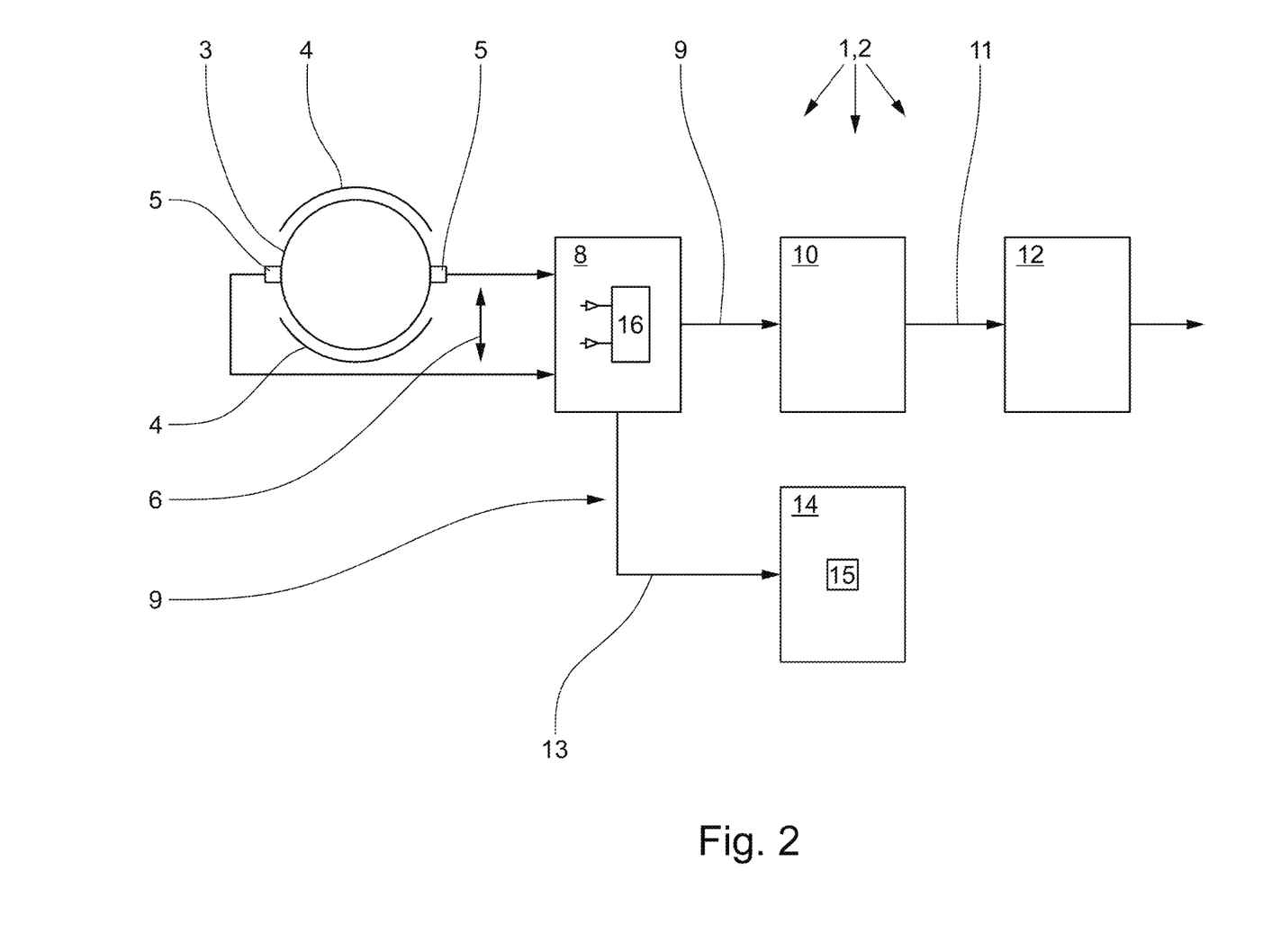
FIG. 2 illustrates a second variation of the method for operating a magnetic-inductive flowmeter and a corresponding magnetic-inductive flowmeter with a digital/analog converter in the first signal path.

FIG. 2 shows that the signal sensor 8 of the first signal path 7 digitizes the noisy raw measurement signal 6 with an analog/digital converter 16 and passes it on as a digitized, detected noisy raw measurement signal 9. In this case, the second signal path 13 receives the now-digitized, detected, noisy raw measurement signal 9 of the first signal path 7 and transmits it to the second signal processing device 14, where the frequency analysis 15 of the noisy raw measurement signal 9 is carried out. This variation is particularly advantageous because digital data can be channeled off and forwarded without loss of content as long as defined signal levels are maintained.

Figure 3:
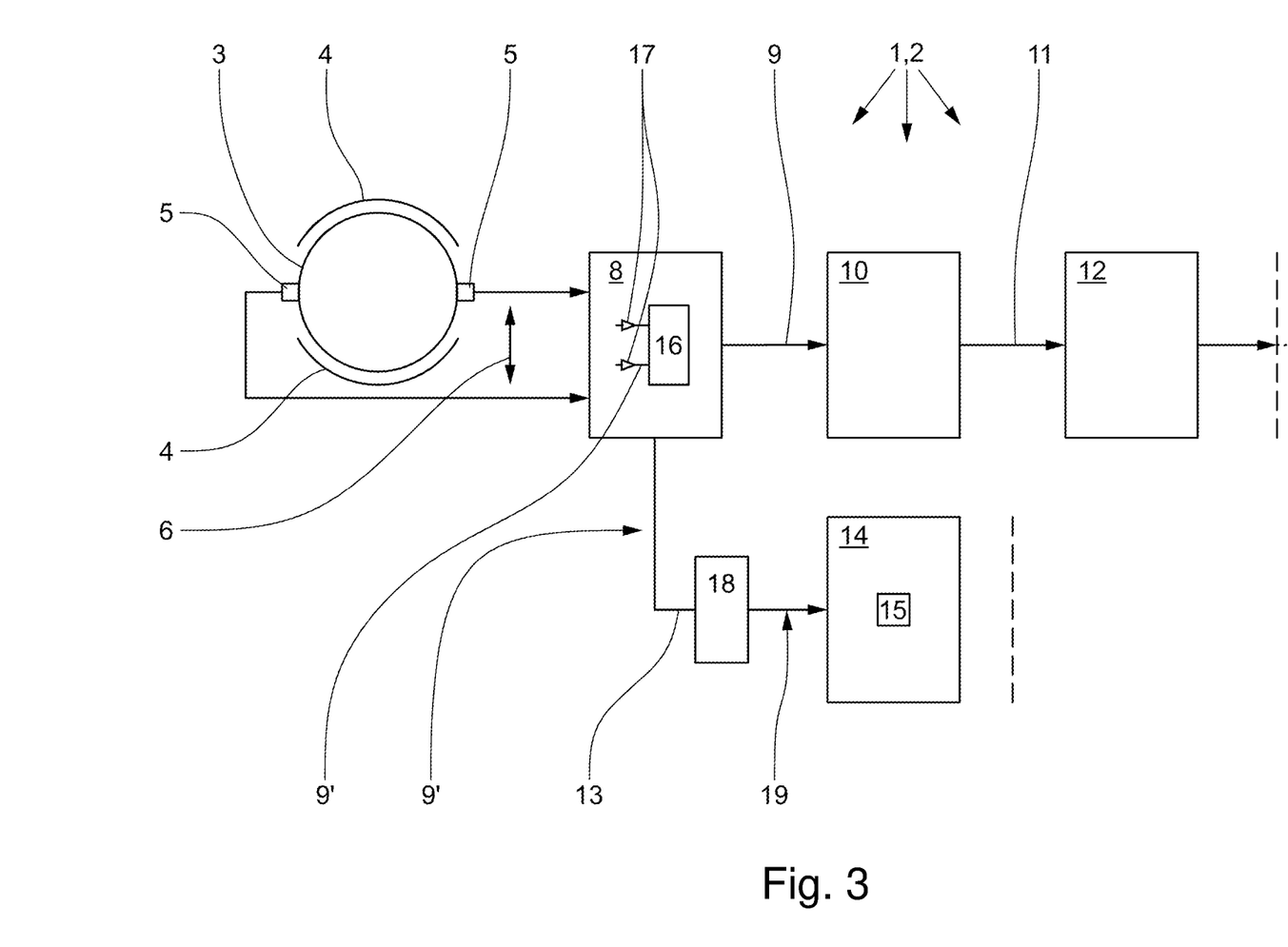
FIG. 3 illustrates a further variation of the method for operating a magnetic-inductive flowmeter and a corresponding magnetic-inductive flowmeter with a transformer stage for tapping the noisy raw measurement signal with high impedance.

FIG. 3 shows that the signal sensor 8 of the first signal path 7 taps the noisy raw measurement signal 6 from the electrodes 5 with a transformer stage 17 with high impedance (this was also implemented in FIG. 2) and passes the tapped, noisy raw measurement signal 9' with a high incidence on with a low impedance. Usually, this transformer stage 17 is an amplifier stage which allows a feedback-free detection of the sensitive, noisy raw measurement signal 6 (buffer, impedance converter, amplifier stage with high-impedance input and low-impedance output). The second signal path 13 takes the forwarded, detected, noisy raw measurement signal 9' with low impedance of the first signal path and transmits it, in this case, to the second signal processing device 14, where frequency analysis 15 is carried out. In the illustrated embodiment, the detected, noisy raw measurement signal 9' transmitted to the second signal processing device 14 is digitized by an analog-to-digital converter 18 before it reaches the second signal processing device 14. The procedure shown here has the advantage that different sampling frequencies can be used in the first signal path 7 and in the second signal path 13.

Figure 4:
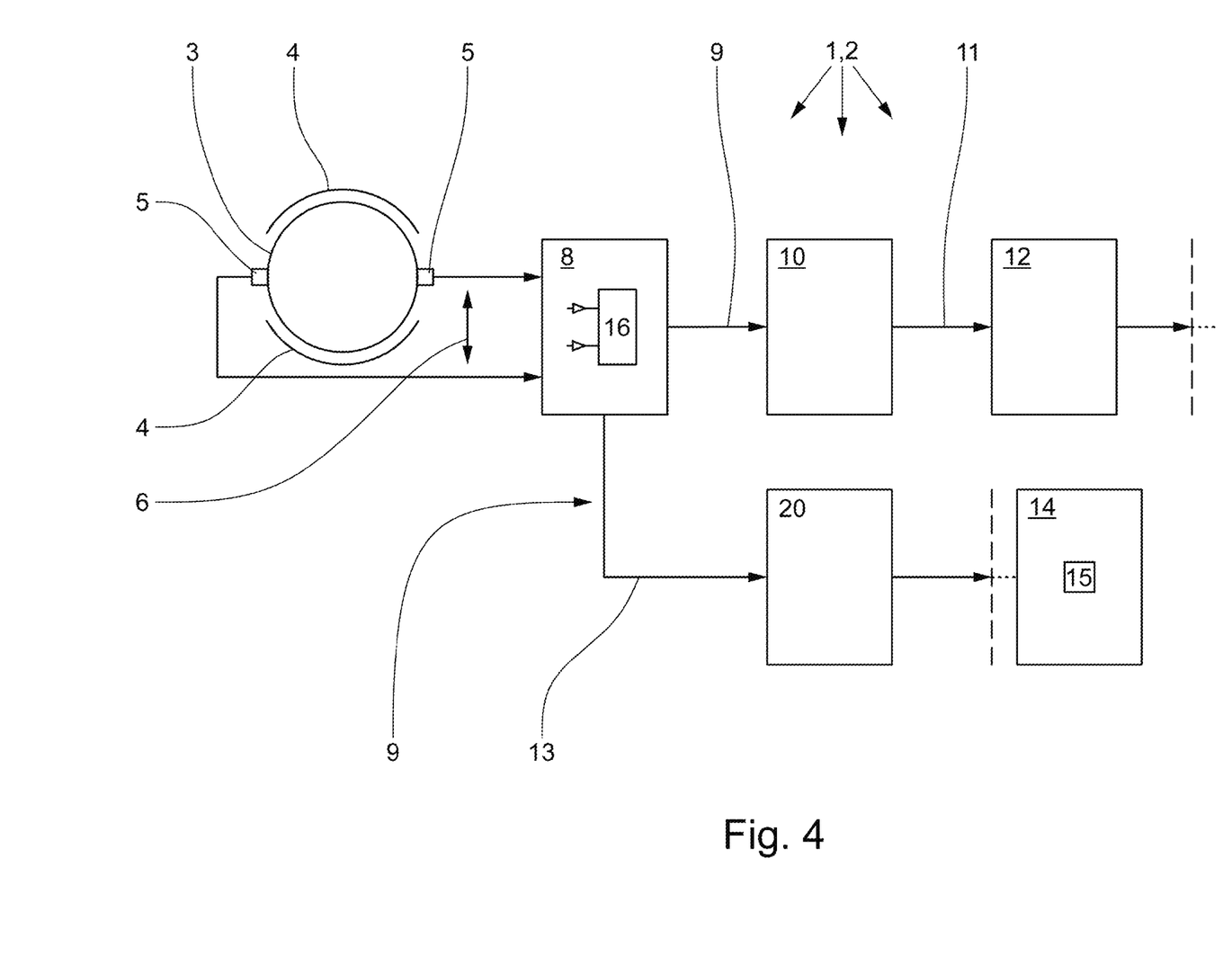
FIG. 4 illustrates a further variation of the method for operating a magnetic-inductive flowmeter and a corresponding magnetic-inductive flowmeter with a further signal interface.

FIG. 4 shows an interesting variation of the method 1 and the magnetic-inductive flowmeter 2. The variation is characterized in that the noisy raw measurement signal 9 detected by the second signal path 13 is transmitted to the second signal processing device 14 via a further signal interface 20 of the magnetic-inductive flowmeter 2 which is different from the working signal interface 12. Accordingly, the second signal processing device 14 is located outside the magnetic-inductive flowmeter 2, wherein the boundary is indicated here by the two vertical dashed lines, as is also the case in FIG. 3. The further signal interface 20 is designed as an Ethernet interface in the embodiment shown. The second signal processing device 14 can thus be implemented quite remotely from the magnetic-inductive flowmeter 2 shown. For example, in a control station, in a laptop, in a handheld device or even at the manufacturer of the magnetic-inductive flowmeter 2 or the installer of the process engineering system in which the magnetic-inductive flowmeter in question is installed.

In contrast to the embodiment according to FIG. 4, the detected, noisy raw measurement signal 9' is transmitted to the second signal processing device 14 in the embodiment according to FIG. 3, wherein the second signal processing device 14 is implemented within the magnetic-inductive flowmeter 2; again, note the vertical dashed lines indicating the physical boundary of the schematically illustrated magnetic-inductive flowmeter.

The magnetic-inductive flowmeters 2 according to FIGS. 2 to 4 are characterized in that the second signal path 13 and the circuit elements in the second signal path 13 are implemented independently of the first signal path 7 and the circuit elements of the first signal path 7 in terms of circuitry. This does not, of course, include the always-necessary connection in terms of signals with which the detected, noisy raw measurement signal 9, 9' of the first signal path 7 is transmitted to the second signal path 13. An implementation of the magnetic-inductive flowmeter 2 under this condition has the advantage that the second signal path 13 can also be subsequently installed in an already existing magnetic-inductive flowmeter 2 with a first signal path 7. Irrespective of the possibility of retrofitting, this solution also has the advantage that the implementation of the second signal path 13 does not conflict with any technical certification of the circuit or of a circuit part in the first signal path 7 (e.g., SIL certification).

Figure 5:
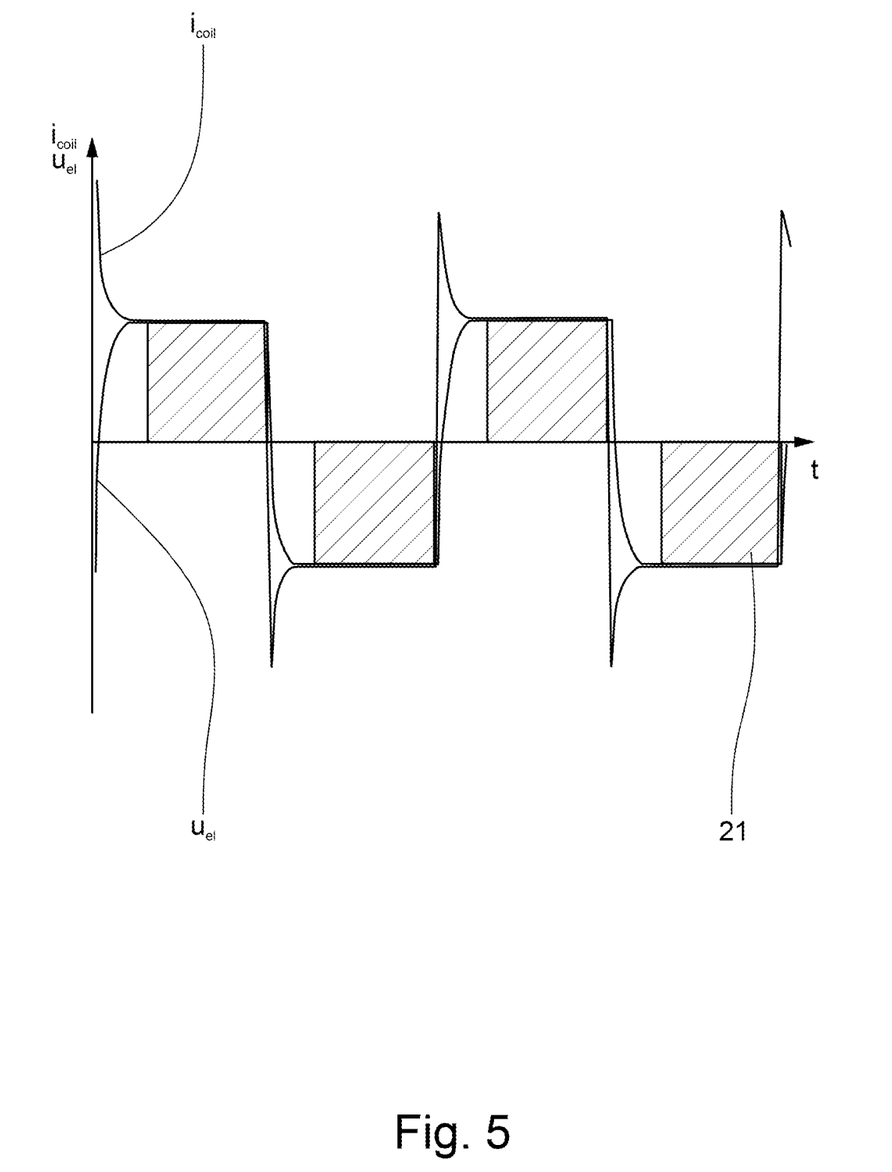
FIG. 5 schematically illustrates of a time curve of the electrical voltage between the electrodes depending on the electrical current through the coils of the magnetic field generator and resulting time windows for measurement.

FIG. 5 shows the course of the coil current $i_{coil}$ with which the field coils are energized in the magnetic field generator 4, and the course of the raw measurement signals 6, 9 (shown smoothly here) in the form of the electrode voltage $u_{el}$. The current direction is thus periodically switched, with which the magnetic field direction and the sign of the induced measuring voltage also change periodically. As can be seen in FIG. 5, the voltage $u_{el}$ at the electrodes 5 is stationary only in one area of the entire curve. Accordingly, in the methods 1 and in the magnetic-inductive flowmeters 1, care is taken that only the transmitted, noisy raw measurement signals 9, 9' located in the stationary time windows 21 are used for frequency analysis 15.

Figure 6A:
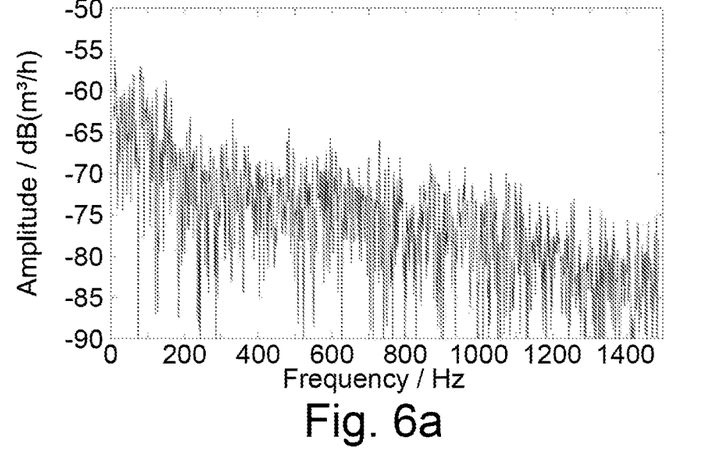
FIGS. 6a-6c illustrates frequency analyses of the detected, noisy raw measurement signals and averaging of several frequency analyses.
Figure 6B:
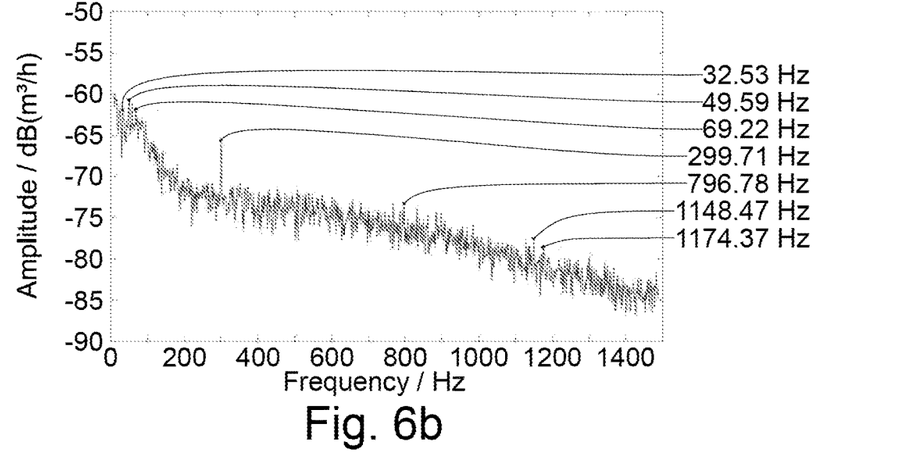
Figure 6C:
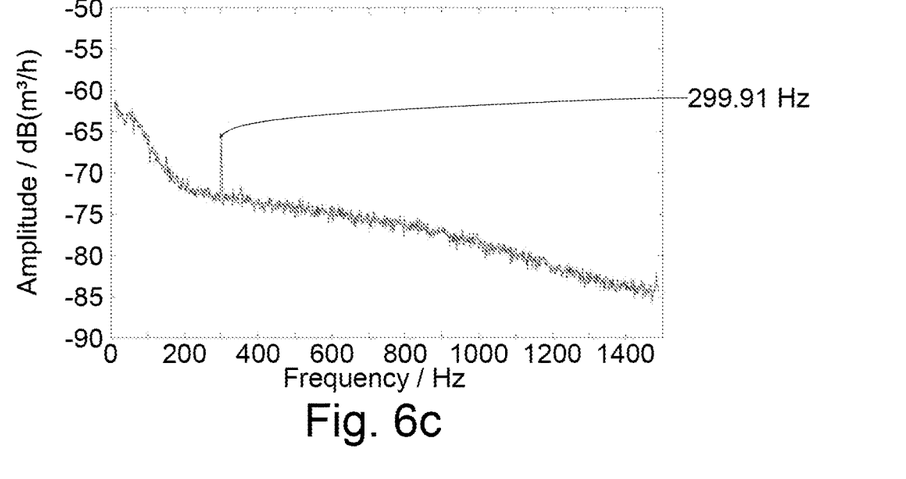

FIG. 6 shows the advantageous effect of averaging several frequency analyses 15. For this, several frequency analyses 15 with transmitted, noisy raw measurement signals 9, 9' from several time windows 21 of constant magnetic field are calculated by the first signal processing device 10 and/or by the second signal processing device 14. Typically, an amplitude spectrum results, where the signal amplitudes are, thus, plotted over the signal frequency as an illustration of the frequency-dependent energy distribution of the analyzed raw measurement signal; these are the frequency-dependent result values of the frequency analyses 15. An average is taken over the frequency-dependent result values of the frequency analyses 15, so that an averaged frequency analysis results. FIG. 6a shows the result of the frequency analysis 15 of the raw measurement signals of a single time window, FIG. 6b shows an averaged frequency analysis of raw measurement signals from ten time windows 21, and FIG. 6c shows an averaged frequency analysis 15 of raw measurement signals from 120 time windows 21. It can be clearly seen that the averaged results have a considerably smaller fluctuation range and are therefore more reliable.

The methods 1 and the magnetic-inductive flowmeters 2 in the illustrated embodiments are designed in such a way that fast Fourier transforms are carried out as frequency analysis 15 in each case on the basis of the detected, noisy raw measurement signals 9, 9', wherein the number of noisy raw measurement signals 9, 9' is increased to the next higher power of two by zero padding, in particular when the number of noisy raw measurement values of a time window 21 available for the frequency analysis 15 does not correspond to a power of two.

The invention claimed is:
1. A method for operating a magnetic-inductive flowmeter with a measuring tube for guiding a medium, with a magnetic field generator for generating a magnetic field passing through the measuring tube perpendicular to the direction of flow of the medium, and with a pair of electrodes for tapping an electrical voltage induced in the medium in the measuring tube as a noisy raw measurement signal, the method comprising:
   detecting the noisy raw measurement signal having a first signal path by a signal sensor with high impedance by the pair of electrodes;
   passing the detected, noisy raw measurement signal on to a first signal processing device;
   processing the detected, noisy raw measurement signal by the signal processing device at least into a noise-removed flow measurement signal;
   outputting the noise-removed flow measurement signal via a working signal interface;
   detecting the detected, noisy raw measurement signal of the first signal path with a second signal path;
   periodically reversing the magnetic field generated by the magnetic field generator; and
   transmitting the detected, noisy raw measurement signal at least indirectly to the first signal processing device and/or a second signal processing device;
   wherein the first signal processing device and/or the second signal processing device carries out a plurality of frequency analyses of only portions of the detected, noisy raw measurement signal that originate from respective time windows in which the magnetic field is constant; and wherein respective frequency-dependent result values of the plurality of frequency analyses are averaged to form an averaged frequency analysis.

2. The method according to claim 1, wherein the signal sensor of the first signal path digitizes the noisy raw measurement signal with an analog/digital converter and passes the noisy raw measurement signal on as a digitized, detected, noisy raw measurement signal; and wherein the second signal path detects the digitized, detected, noisy raw measurement signal of the first signal path and transmits the digitized, detected, noisy raw measurement signal to the first signal processing device and/or the second signal processing device.

3. The method according to claim 1, wherein the signal sensor of the first signal path taps the noisy raw measurement signal from the electrodes with a high impedance with a transformer stage and passes the noisy raw measurement signal tapped with a high impedance on with a low impedance;

wherein the second signal path detects the detected, noisy raw measurement signal of the first signal path which is passed on with low impedance and transmits the detected, noisy raw measurement signal to the first signal processing device and/or the second signal processing device; and wherein the detected, noisy raw measurement signal transmitted to the first signal processing device and/or the second signal processing device is digitized in the second signal path by the analog/digital converter and the digitized, detected, noisy raw measurement signal is transmitted to the first signal processing device and/or the second signal processing device.

4. The method according to claim 1, wherein the noisy raw measurement signal detected by the second measurement signal path is transmitted at least indirectly via a further signal interface of the magnetic-inductive flowmeter, which is different from the working signal interface, to the second signal processing device external to the magnetic-inductive flowmeter.

5. The method according to claim 1, wherein the noisy raw measurement signal detected by the second measurement signal path is transmitted to the first signal processing device and/or the second signal processing device within the magnetic-inductive flowmeter.

6. The method according to claim 1, wherein each of the plurality of frequency analyses involves performing a fast Fourier transform; and wherein a number of the noisy raw measurement signals is increased to the next higher power of two by zero padding if the number of noisy raw measurement values of a time window available for the plurality of frequency analyses does not correspond to a power of two.

7. A magnetic-inductive flowmeter, comprising:
a measuring tube for guiding a medium;
a magnetic field generator for generating a magnetic field passing through the measuring tube perpendicular to the direction of flow of the medium;
a pair of electrodes for tapping an electrical voltage induced in the medium in the measuring tube as a noisy raw measurement signal;
wherein the noisy raw measurement signal with a first signal path is detected by a signal sensor with high impedance by the pair of electrodes and is passed on as a detected, noisy raw measurement signal from the signal sensor to a first signal processing device and is processed by the first signal processing device at least into a noise-removed flow measurement signal and the noise-removed flow measurement signal is output via a working signal interface;

wherein a second signal path is implemented and the detected, noisy raw measurement signal of the first signal path is detected with the second signal path and is transmitted at least indirectly to the first signal processing device and/or a second signal processing device;

wherein the first signal processing device and/or the second signal processing device carries out a frequency analysis of the detected, noisy raw measurement signal; and wherein the second signal path and circuit elements in the second signal path are implemented independently of the first signal path and circuit elements of the first signal path in terms of circuitry.

8. The magnetic-inductive flowmeter according to claim 7, wherein the signal sensor of the first signal path digitizes the noisy raw measurement signal with an analog/digital converter and passes the noisy raw measurement signal on as a digitized, detected, noisy raw measurement signal; and wherein the second signal path detects the digitized, detected noisy raw measurement signal of the first signal path and transmits the digitized, detected noisy raw measurement signal to the first signal processing device and/or the second signal processing device.

9. The magnetic-inductive flowmeter according to claim 7, wherein the signal sensor of the first signal path taps the noisy raw measurement signal from the electrodes with a high impedance by means of a transformer stage and passes the noisy raw measurement signal tapped with a high impedance on with a low impedance;

wherein the second signal path detects the detected, noisy raw measurement signal of the first signal path, which is passed on with low impedance, and transmits the detected, noisy raw measurement signal to the first signal processing device and/or the second signal processing device; and wherein the detected, noisy raw measurement signal transmitted to the first signal processing device and/or the second signal processing device is digitized in the second signal path by an analog/digital converter and the digitized, detected, noisy raw measurement signal is transmitted to the first signal processing device and/or the second signal processing device.

10. The magnetic-inductive flowmeter according to claim 7, wherein the detected, noisy raw measurement signal is transmitted via a further signal interface of the magnetic-inductive flowmeter, which is different from the working signal interface, to the second signal processing device external to the magnetic- inductive flowmeter.

11. The magnetic-inductive flowmeter according to claim 7, wherein the detected, noisy raw measurement signal is transmitted to the first signal processing device and/or the second signal processing device within the magnetic- inductive flowmeter.

12. The magnetic-inductive flowmeter according to claim 7, wherein the magnetic-inductive flowmeter is designed such that the magnetic field generated by the magnetic field generator is reversed periodically; and wherein the first signal processing device and/or the second signal processing device carry out a plurality of frequency analyses of only portions of the detected, noisy raw measurement signal that originate from respective time windows in which the magnetic field is constant.

13. The magnetic-inductive flowmeter according to claim 12, wherein respective frequency-dependent result values of the plurality of frequency analyses are averaged to form an averaged frequency analysis.

14. The magnetic-inductive flowmeter according to claim 7, wherein each of the plurality of frequency analyses involves performing a fast Fourier transform; and wherein a number of the noisy raw measurement signals is increased to the next higher power of two by zero padding if the number of noisy raw measurement values of a time window available for the plurality of frequency analyses does not correspond to a power of two.

* * * * *